US010863349B2

(12) United States Patent
Takehara

(10) Patent No.: US 10,863,349 B2
(45) Date of Patent: Dec. 8, 2020

(54) COMMUNICATION DEVICE, COMMUNICATION METHOD, AND MOBILE OBJECT COMMUNICATION SYSTEM

(71) Applicant: Mitsubishi Electric Corporation, Tokyo (JP)

(72) Inventor: Takayoshi Takehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/260,262

(22) Filed: Jan. 29, 2019

(65) Prior Publication Data
US 2020/0100103 A1  Mar. 26, 2020

(30) Foreign Application Priority Data

Sep. 26, 2018 (JP) .................. 2018-179683

(51) Int. Cl.
*H04W 12/00* (2009.01)
*H04W 64/00* (2009.01)
*H04W 12/06* (2009.01)

(52) U.S. Cl.
CPC . *H04W 12/00503* (2019.01); *H04W 12/0027* (2019.01); *H04W 12/00518* (2019.01); *H04W 12/0605* (2019.01); *H04W 64/006* (2013.01)

(58) Field of Classification Search
CPC ....... H04W 12/00503; H04W 12/0605; H04W 12/00518; H04W 64/006; H04W 12/0027;
(Continued)

(56) References Cited

U.S. PATENT DOCUMENTS 8,204,478 B2 * 6/2012 Na .................. H04L 9/321
455/411
2005/0083887 A1 4/2005 Lee et al.
(Continued)

FOREIGN PATENT DOCUMENTS

JP 11-068823 A 3/1999
JP 2003304571 A 10/2003
(Continued)

OTHER PUBLICATIONS

Communication dated Jul. 9, 2019 from the Japanese Patent Office in counterpart application No. 2018-179683.
(Continued)

*Primary Examiner* — Ali S Abyaneh
(74) *Attorney, Agent, or Firm* — Sughrue Mion, PLLC; Richard C. Turner

(57) ABSTRACT

A communication device for providing a service in response to a request from a mobile object includes: a reception unit for receiving identification information from the mobile object; an authentication unit for performing authentication of the identification information; a service provision unit for providing the service to a mobile object having legitimately registered identification information on the basis of a result of authentication performed by the authentication unit; a mobile object detection unit for detecting movement of the mobile object; a communication device detection unit for detecting another communication device in the vicinity of the mobile object on the basis of a result of detection performed by the mobile object detection unit; and an instruction unit for causing the other communication device detected by the communication device detection unit to provide a service equivalent to the service to the mobile object without performing authentication for the mobile object.

3 Claims, 3 Drawing Sheets

(58) Field of Classification Search
CPC ....... H04W 72/0433; H04W 12/00516; H04W 36/08; H04W 36/10; H04W 48/20; H04W 88/08

See application file for complete search history.

(56) References Cited

U.S. PATENT DOCUMENTS

| | | |
|---|---|---|
| 2005/0117524 A1 | 6/2005 | Lee et al. |
| 2005/0141457 A1 | 6/2005 | Lee et al. |
| 2005/0143073 A1 | 6/2005 | Lee et al. |
| 2006/0146752 A1* | 7/2006 | Jang ............... H04L 63/0892 370/331 |
| 2007/0025293 A1* | 2/2007 | Choi ............... H04W 36/0083 370/331 |

FOREIGN PATENT DOCUMENTS

| | | |
|---|---|---|
| JP | 2004166277 A | 6/2004 |
| JP | 2008301113 A | 12/2008 |

OTHER PUBLICATIONS

"Mobile Edge Computing—Introductory Technical White Paper", Sep. 2014, pp. 1-36, Issue 1.

Internet White Paper 2011, Internet Association Japan (ed.), Impress Japan, published on Jul. 29, 2011, pp. 130 to 134.

\* cited by examiner

COMMUNICATION DEVICE, COMMUNICATION METHOD, AND MOBILE OBJECT COMMUNICATION SYSTEM

BACKGROUND OF THE INVENTION

1. Field of the Invention

The present disclosure relates to a communication device, a communication method, and a mobile object communication system for providing a service to a mobile object.

2. Description of the Background Art

In mobile object communication, mobile edge computing (MEC) has been proposed in which a server is placed in the vicinity of an access point or a communication base station for mobile communication such as a long term evolution (LTE) base station. The MEC is considered to be highly advantageous, for example, in that communication delay (latency) is reduced by placing the MEC server in the vicinity of the user, thus reducing the backhaul band, and various use cases have also been proposed (e.g., Non-Patent Document 1).

Non-Patent Document 1 proposes, for example, a system in which a video stream captured by a camera is transcoded in the MEC server, and the transcoded video stream is transferred from the MEC server to a core network at a low band, or a system in which a cache is provided in a core network, and a packet from a content source such as the Internet is temporarily cached in the core network, and the packet is transmitted from the core network to a MEC server in a LTE base station by a low-band backhaul transfer, stored in a local cache of the MEC server, and then transferred to a terminal.

Non-Patent Document 2 describes technology in which an access path to the Internet is switched for offload.

Patent Document 1 discloses the following configuration. A member terminal receives a home page from a common server device, and displays the home page on a liquid crystal display (LCD). From service selection icons contained in the displayed home page, input of selection of the service selection icon corresponding to the information provision service desired by the user of the member terminal is accepted, and execution of the selected information provision service is requested to the common server device. This allows the user of the member terminal to receive the desired information provision service from the common server device.

Patent Document 1: Japanese Laid-Open Patent Publication No. 11-68823
Non-Patent Document 1: "Mobile Edge Computing—Introductory Technical White Paper"
Non-Patent Document 2: Internet White Paper 2011, Internet Association Japan (ed.), Impress Japan, published on Jul. 29, 2011, pages 130 to 134

A problem in services using the NEC server is that the continuity of services cannot be ensured, for example, due to movement of a mobile object serving as a terminal. For example, there may be a situation where a service using the MEC server is provided in a base station (hereinafter referred to as the communication device), and the continuity of the service cannot be ensured when the mobile object has moved and experienced hand-over between communication devices. For example, when a mobile object receiving a service from a given communication device moves, the mobile object needs to receive the service from another communication device at the movement destination. At this time, the mobile object needs to undergo an authentication procedure in order to receive the service from the other communication device at the movement destination. For the authentication procedure, the provision of the service from the other communication device at the movement destination to the mobile object is temporarily suspended. That is, the continuity of the provision of the service from the communication device to the mobile object is not ensured.

In such a situation, problems such as interruption of the service, deterioration in quality (e.g., quality of experience (QoE)) may occur, thus significantly reducing the customer satisfaction.

SUMMARY OF THE INVENTION

The present disclosure has been made to solve the above-described problems, and an object of the present disclosure is to provide a communication device, a communication method, and a mobile object communication system that allow a mobile object to continuously receive a service from a communication device, thereby enhancing the service quality.

A communication device according to the present disclosure is a communication device for providing a service in response to a request from a mobile object, the communication device including: a reception unit configured to receive identification information from the mobile object; an authentication unit configured to perform authentication of the identification information; a service provision unit configured to provide the service to a mobile object having legitimately registered identification information on the basis of a result of authentication performed by the authentication unit; a mobile object detection unit configured to detect movement of the mobile object; a communication device detection unit configured to detect another communication device in the vicinity of the mobile object on the basis of a result of detection performed by the mobile object detection unit; and an instruction unit configured to cause the other communication device detected by the communication device detection unit to provide a service equivalent to the service to the mobile object without performing authentication for the mobile object.

A communication method according to the present disclosure is a communication method for providing a service in response to a request from a mobile object, the communication method including: a reception step of receiving identification information from the mobile object; an authentication step of performing authentication of the identification information; a service provision step of providing the service to a mobile object having legitimately registered identification information on the basis of a result of authentication performed in the authentication step; a mobile object detection step of detecting movement of the mobile object; a communication device detection step of detecting another communication device in the vicinity of the mobile object on the basis of a result of detection performed in the mobile object detection step; and an instruction step of causing the other communication device detected in the communication device detection step to provide a service equivalent to the service to the mobile object without performing authentication for the mobile object.

A mobile object communication system according to the present disclosure is a mobile object communication system including a plurality of communication devices for providing a service in response to a request from a mobile object, wherein each of the communication devices includes: a reception unit configured to receive identification information from the mobile object; an authentication unit configured to perform authentication of the identification information; a service provision unit configured to provide the service to a mobile object having legitimately registered identification information on the basis of a result of authentication performed by the authentication unit; a mobile object detection unit configured to detect movement of the mobile object; a communication device detection unit configured to detect another communication device in the vicinity of the mobile object on the basis of a result of detection performed by the mobile object detection unit; and an instruction unit configured to instruct the other communication device detected by the communication device detection unit to provide a service equivalent to the service to the mobile object without performing authentication for the mobile object, and the other communication device includes: an instruction accepting unit configured to accept an instruction from the instruction unit; a comparison unit configured to compare identification information contained in the instruction accepted by the instruction accepting unit with identification information recorded in a mobile object list, and extract the same identification information; and a service provision unit configured to provide a service equivalent to the service to a mobile object having the identification information extracted by the comparison unit.

The present disclosure allows a mobile object to continuously receive a service from a communication device even when the mobile object has moved, thereby enhancing the service quality.

DETAILED DESCRIPTION OP THE PREFERRED EMBODIMENTS OF THE INVENTION

First Embodiment

Figure 1:
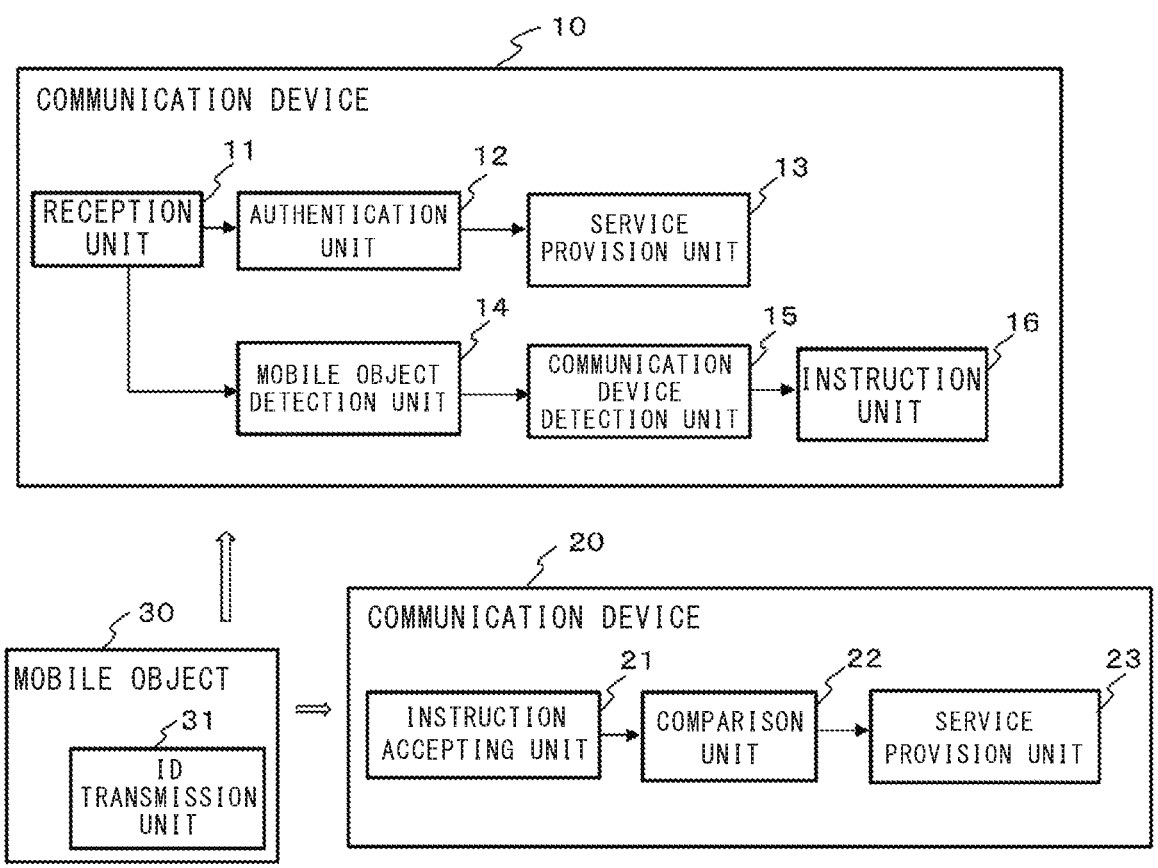
FIG. 1 is a block diagram showing an outline of the configuration of a mobile object communication system including communication devices according to the first embodiment.

Hereinafter, a communication device and a mobile object communication system according to the first embodiment of the present disclosure will be described with reference to FIGS. 1 to 3. FIG. 1 shows an outline of the configuration of a mobile object communication system including communication devices according to the first embodiment.

The mobile object communication system shown in FIG. 1 is composed of two communication devices 10 and 20 serving as base stations of the mobile object communication system, and a mobile object 30, such as a mobile terminal, that receives a predetermined service from the communication device 10 or the communication device 20.

Although only two communication devices 10 and 20 are shown in FIG. 1, many communication devices are actually provided at predetermined distance intervals, and each of the communication devices 10 and 20 provides various services in response to a request from the mobile object 30.

The communication device 10 includes a reception unit 11, an authentication unit 12, a service provision unit 13, a mobile object detection unit 14, a communication device detection unit 15, and an instruction unit 16.

The reception unit 11 receives identification information (ID information) that is transmitted from an ID transmission unit 31 of the mobile object 30. The authentication unit 12 performs authentication of the identification information from the mobile object 30 that has been received by the reception unit 11. Here, "authentication" refers to a process for confirming whether the mobile object 30 is a legitimately registered mobile object by checking, for example, whether the mobile object 30 has signed up for a contract for the service.

The service provision unit 13 provides a service to a mobile object 30 having proper identification information on the basis of a result of authentication performed by the authentication unit 12. The service includes, for example, a safety support service between vehicles, or between a vehicle and a pedestrian.

The mobile object detection unit 14 detects movement of the mobile object 30, i.e., detects in which direction the mobile object 30 is moving, on the basis of the position or behavior (speed or acceleration) of the mobile object 30. The communication device detection unit 15 detects another communication device, for example, the communication device 20 in this case, that is present in a vicinity area where communication can be established with the mobile object 30, on the basis of a result of detection of movement of the mobile object 30 by the mobile object detection unit 14.

The instruction unit 16 instructs the other communication device 20 detected by the communication device detection unit 15 to, 1) without performing authentication for the mobile object 30, 2) provide an equivalent service to the mobile object 30.

Specifically, the instruction unit 16 performs instruction for identification information (ID information) and a type of authenticated service, as will be described below.

The mobile object 30 includes an ID transmission unit 31. The ID transmission unit 31 transmits the identification information (ID information) of its own mobile object 30 to a nearby communication device 10. In addition, the ID transmission unit 31 transmits its own identification information (ID information) to the communication device 20 when its own mobile object 30 enters an area of another communication device 20.

The communication device 20 includes an instruction accepting unit 21, a comparison unit 22, and a service provision unit 23.

The instruction accepting unit 21 accepts an instruction from the instruction unit 16 of the communication device 10. The comparison unit 22 compares the identification information (ID information) contained in the instruction accepted by the instruction accepting unit 21 with the identification information (ID information) recorded in a mobile object list held by the communication device 20, and extracts the same identification information. Here, the mobile object list held by the communication device 20 refers to a list of the identification information (ID information) of mobile objects that are being detected by the communication device 20 at that time.

The service provision unit 23 provides, to the mobile object having the identification information (ID information extracted by the comparison unit 22, a service equivalent to the service having been provided by the communication device 10.

Although the communication devices 10 and 20 shown in FIG. 1 are depicted as having different configurations, they actually have the same configuration.

That is, the communication device 10 includes the instruction accepting unit 21, the comparison unit 22, and the service provision unit 23 that are described in the communication device 20. Meanwhile, the communication device 20 includes the reception unit 11, the authentication unit 12, the service provision unit 13, the mobile object detection unit 14, the communication device detection unit 15, and the instruction unit 16 that are described in the communication device 10.

Next, operations in the communication device according to the first embodiment will be described with reference to the flowchart in FIG. 2.

Figure 2:
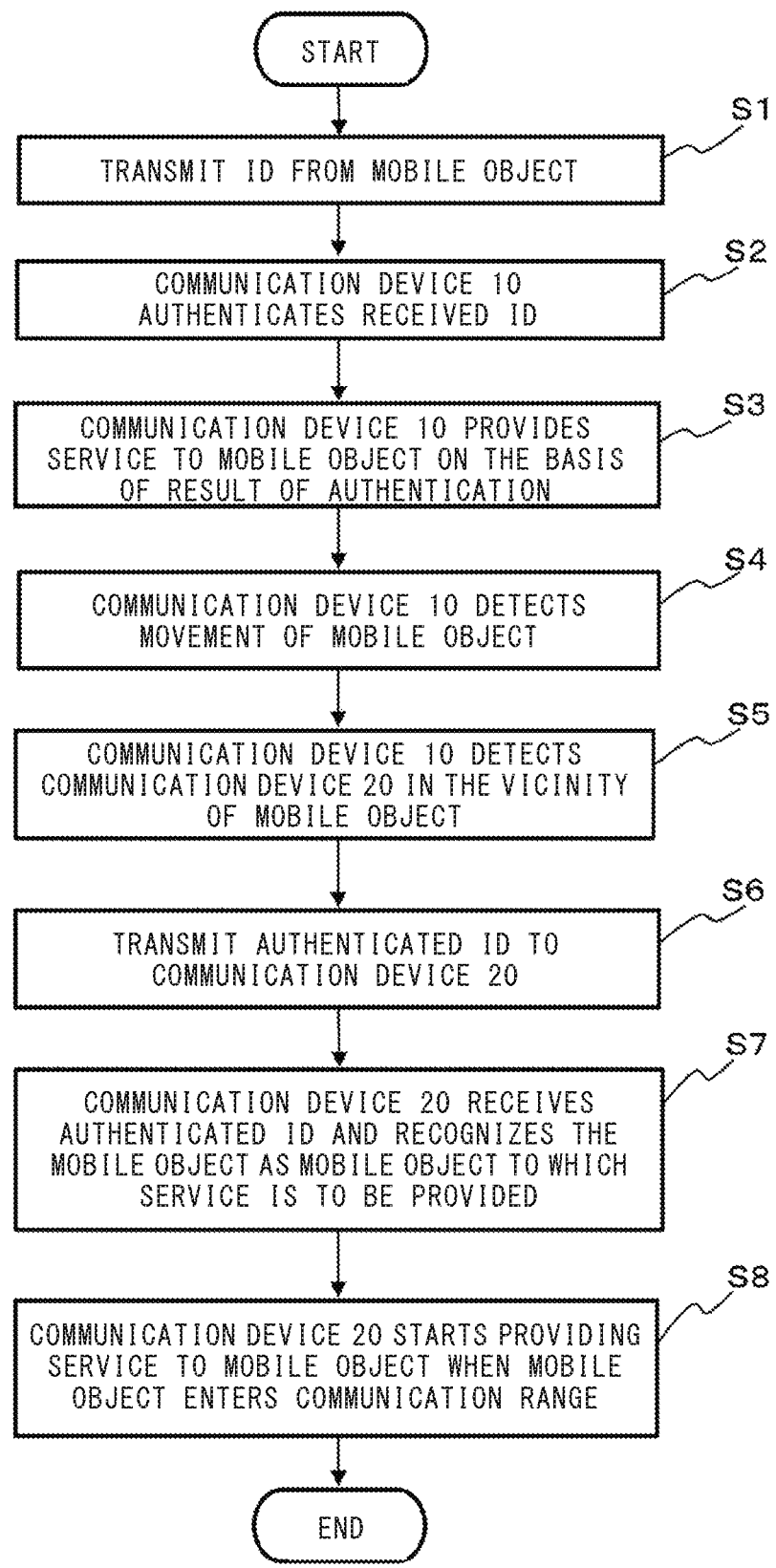
FIG. 2 is a diagram showing a flowchart illustrating operations of the communication devices according to the first embodiment.

Referring to FIG. 2, in step S1, the mobile object 30 transmits its own identification information (ID information) to the communication device 10. In step S2, the authentication unit 12 authenticates the identification information (ID information) of the mobile object 30 that has been received by the reception unit 11 of the communication device 10. In step S3, the service provision unit 13 provides a service to the mobile object 30 on the basis of a result of authentication performed by the authentication unit 12 of the communication device 10. In step S4, the mobile object detection unit 14 of the communication device 10 detects movement of the mobile object 30. For example, the communication device 10 periodically acquires the position or behavior (speed or acceleration) from the mobile object 30, and estimates future movement of the mobile object 30.

In step S5, on the basis of a result of detection of movement of the mobile object 30, the communication device detection unit 15 of the communication device 10 detects another communication device 20 in the vicinity of the mobile object 30 that is estimated to enter the management area in the future. In step S6, the authenticated identification information (ID information) is transmitted from the instruction unit 16 of the communication device 10 to the communication device 20.

In step S7, the instruction accepting unit 21 of the communication device 20 receives the identification information (ID information) from the instruction unit 16 of the communication device 10, and the comparison unit 22 compares the identification information (ID information) contained in the instruction accepted by the instruction accepting unit 21 with the identification information (ID information) recorded is the mobile object list of the communication device 20. Then, if the same identification information is extracted, the mobile object 30 is recognized as a mobile object 30 to which the service is to be provided. The comparison of the identification information (ID information) performed in step S7 is not authentication for the mobile object 30, but merely comparison, and thus a time for the authentication procedure is not needed.

In step S8, when the mobile object 30 enters the management area, the service provision unit 23 of the communication device 20 starts providing, to the mobile object 30, a service similar to that provided by the communication device 10.

Here, takeover of a service from the communication device 10 by the communication device 20 will be described.

Each of the communication devices 10 and 20 manages a coverage area. When the mobile object 30 has moved from the coverage area of the communication device 10 to the coverage area of the communication device 20, the communication device 10 sends a takeover message to the communication device 20.

Figure 3:
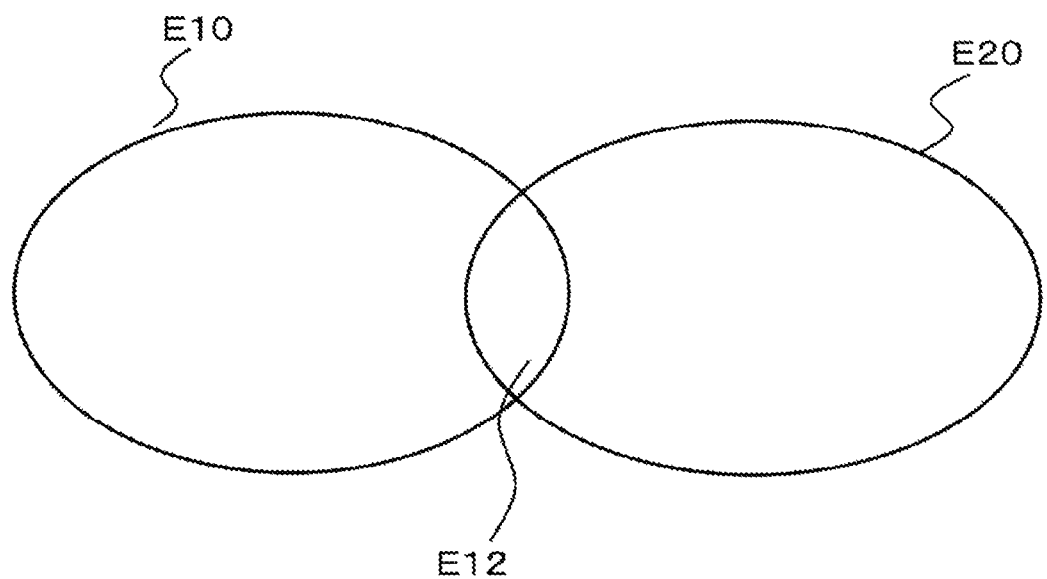
FIG. 3 is a diagram showing coverage areas of the communication devices according to the first embodiment.

An image diagram of the coverage areas is shown in FIG. 3. Referring to FIG. 3, when the mobile object 30 enters an area E12 where a coverage area E10 of the communication device 10 and a coverage area E20 of the communication device 20 are overlapped, a takeover message is transmitted from the communication device 10 to the communication device 20. The takeover message is transmitted from the instruction unit 16 of the communication device 10 to the instruction accepting unit 21 of the communication device 20.

The information of a final message transmitted from the communication device 10 to the mobile object 30 is described in the takeover message, and the communication device 20 transmits a message to the mobile object 30, starting from the message next to the final message.

Although the present disclosure is described above in terms of an exemplary embodiment, it should be understood that the various features, aspects and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

INDUSTRIAL APPLICABILITY

As described above, the present disclosure is suitable for a communication device, a mobile object communication system, and a mobile object communication network system that provide a service to a mobile object.

DESCRIPTION OF THE REFERENCE CHARACTERS

10 communication device
11 reception unit
12 authentication unit
13 service provision unit
14 mobile object detection unit
15 communication device detection unit
16 instruction unit
20 communication device
21 instruction accepting unit
22 comparison unit
23 service provision unit
30 mobile object
31 ID transmission unit

What is claimed is:

1. A first communication device for providing a service in response to a request from a mobile object, wherein the first communication device is associated with a first coverage area, the communication device comprising:
   a processor and a memory, the processor configured to:
      receive identification information from the mobile object;
      perform an authentication of the identification information;
      provide the service to the mobile object having legitimately registered identification information based on the authentication;

detect movement of the mobile object by detecting a first direction in which the mobile object is moving;

detect, based on the first direction, a second communication device in a vicinity of the mobile object, wherein the second communication device is associated with a second coverage area;

send a takeover message to the second communication device when the mobile object enters an overlapped area, wherein the overlapped area is an intersection of the first coverage area and the second coverage area, and the takeover message indicates a final message transmitted from the first communication device to the mobile object; and cause the second communication device to provide a service equivalent to the service to the mobile object without performing a second authentication for the mobile object, wherein the equivalent service includes transmission, by the second communication device, of a service-providing message starting from next to the final message.

2. A communication method, by a first communication device associated with a first coverage area, for providing a service in response to a request from a mobile object, the communication method comprising:

receiving identification information from the mobile object;

performing authentication of the identification information;

providing the service to the mobile object having legitimately registered identification information based on the authentication;

detecting movement of the mobile object, wherein the detecting movement includes detecting a first direction in which the mobile object is moving;

detecting, based on the first direction, a second communication device in a vicinity of the mobile object, wherein the second communication device is associated with a second coverage area;

sending a takeover message to the second communication device when the mobile object enters an overlapped area, wherein the overlapped area is an intersection of the first coverage area and the second coverage area, and the takeover message indicates a final message transmitted from the first communication device to the mobile object; and causing the second communication device to provide a service equivalent to the service to the mobile object without performing a second authentication for the mobile object, wherein the equivalent service includes, by the second communication device, of a service-providing message transmission starting from next to the final message.

3. A mobile object communication system comprising a plurality of communication devices for providing a service in response to a request from a mobile object, the plurality of communication devices comprising a first communication device and a second communication device, wherein the first communication device includes:

a first processor and a first memory, the first processor configured to:

receive identification information from the mobile object, perform an authentication of the identification information, provide the service to the mobile object having legitimately registered identification information based on the authentication, detect movement of the mobile object by detecting a first direction in which the mobile object is moving, detect, based on the first direction, a second communication device in a vicinity of the mobile object, wherein the second communication device is associated with a second coverage area, send a takeover message to the second communication device when the mobile object enters an overlapped area, wherein the overlapped area is an intersection of the first coverage area and the second coverage area, and the takeover message indicates a final message transmitted from the first communication device to the mobile object, and cause the second communication device to provide a service equivalent to the service to the mobile object without performing a second authentication for the mobile object, wherein the equivalent service includes transmission, by the second communication device, of a service-providing message starting from next to the final message; and the second communication device includes a processor configured to:

accept an instruction, wherein the instruction is based on the takeover message, compare first identification information contained in the instruction with second identification information recorded in a mobile object list, determine that the first identification information and the second identification information are the same identification information, and provide a service equivalent to the service to the mobile object having the second identification information, without performing a second authentication for the mobile object, wherein the service equivalent includes transmission, by the second communication device, of the service-providing message starting from next to the final message.

* * * * *